United States Patent
Liang et al.

(10) Patent No.: US 10,454,594 B2
(45) Date of Patent: Oct. 22, 2019

(54) MASSIVE MIMO CHANNEL EMULATOR

(71) Applicant: Ping Liang, Newport Coast, CA (US)

(72) Inventors: Ping Liang, Newport Coast, CA (US); Jason Brent, Irvine, CA (US); Dengkui Zhu, Beijing (CN)

(73) Assignee: RF DSP INC., Irvine, CA (US)

( * ) Notice: Subject to any disclaimer, the term of this patent is extended or adjusted under 35 U.S.C. 154(b) by 0 days.

(21) Appl. No.: 16/077,479

(22) PCT Filed: Feb. 17, 2017

(86) PCT No.: PCT/US2017/018518
§ 371 (c)(1),
(2) Date: Aug. 12, 2018

(87) PCT Pub. No.: WO2017/143297
PCT Pub. Date: Aug. 24, 2017

(65) Prior Publication Data
US 2019/0074913 A1    Mar. 7, 2019

Related U.S. Application Data

(60) Provisional application No. 62/296,614, filed on Feb. 18, 2016.

(51) Int. Cl.
*H04B 17/00* (2015.01)
*H04B 7/0452* (2017.01)
*H04B 17/391* (2015.01)

(52) U.S. Cl.
CPC ....... *H04B 17/0087* (2013.01); *H04B 7/0452* (2013.01); *H04B 17/0085* (2013.01); *H04B 17/3912* (2015.01)

(58) Field of Classification Search
CPC ............ H04B 17/0087; H04B 17/3912; H04B 17/0085; H04B 7/0452; H04B 17/3911; H04B 7/0413
See application file for complete search history.

(56) References Cited

U.S. PATENT DOCUMENTS

| | | | | |
|---|---|---|---|---|
| 9,786,999 | B2* | 10/2017 | Kyosti | H01Q 21/20 |
| 2011/0084887 | A1* | 4/2011 | Mow | G01R 29/10 343/703 |
| 2011/0124295 | A1* | 5/2011 | Mahjoubi Amine | H04B 17/0087 455/67.14 |
| 2015/0124911 | A1* | 5/2015 | Wicker, Jr. | H04L 25/0242 375/340 |

* cited by examiner

*Primary Examiner* — David S Huang
(74) *Attorney, Agent, or Firm* — Guosheng Wang; United States Research and Patent Firm

(57) ABSTRACT

This invention presents a RF channel emulator for testing a large-scale Multiple-User Multiple-Input Multiple-Output (MU-MIMO) wireless communication system, including embodiments of using over-the-air channels for connecting a RF channel emulator and a large-scale MU-MIMO wireless communication system, calibration processes that maintain the over-the-air channel reciprocity, and emulation of carrier aggregation.

38 Claims, 4 Drawing Sheets

MASSIVE MIMO CHANNEL EMULATOR

This application claims the benefit of U.S. Provisional Application No. 62/296,614, filed on Feb. 18, 2016.

FIELD OF INVENTION

This invention relates generally to a channel emulator for testing a large-scale Multi-User Multiple-Input Multiple-Output (MU-MIMO) wireless communication system.

BACKGROUND

To meet the continued fast growing demand of mobile data, the wireless industry needs solutions that can achieve high order of spatial re-use of limited spectral resources. One method for increasing spatial re-use of wireless spectrum is MIMO, especially large scale Multi-User MIMO (MU-MIMO), often referred to as massive MIMO. In a wireless communication system, a wireless node with multiple antennas, a Base Station (BS) or a User Equipment (UE), can use beamforming in downlink (DL) or uplink (UL) to increase the Signal-to-Noise Ratio (SNR) or Signal-to-Interference-plus-Noise Ratio (SINR), hence the data rate, of the links with other wireless nodes. A BS with MU-MIMO can beamform to multiple UEs simultaneously in a frequency and time block, e.g., a Resource Block (RB), i.e., using spatial multiplexing to provide capacity growth without the need of increasing the bandwidth. In a large-scale MIMO or massive MIMO system, a BS may be equipped with many tens to hundreds or even thousands of transmit (Tx) chains and receive (Rx) chains and simultaneously beamform to tens of UEs using the same RB. Let the number of BS Tx and Rx chains be M and the number of simultaneously served UEs on the RB be K. There is a need of a hardware RF channel emulator capable of emulate in real-time M×K RF channels. In a TDD system, it is desired that such an emulator maintains the reciprocity of the over the air channel (OTA) so that the BS can estimate the DL OTA channel using UL signaling. This allows the channel estimation in a massive MIMO system to scale with K rather than M, thus significantly reduces the overhead of channel estimation in a massive MIMO system. Furthermore, the antennas in a massive MIMO system may be integrated with the RF circuits and there are no antenna ports for using cables to connect the BS RF paths to the channel emulator. Even if the BS has antenna ports, it will be a hassle to connect many tens or even more RF ports using cables. There are no prior art hardware RF channel emulator exits that meet these needs. This invention presents circuits and methods for building a hardware RF channel emulator that meet the needs of testing of massive MIMO systems.

DETAILED DESCRIPTION

Reference may now be made to the drawings wherein like numerals refer to like parts throughout. Exemplary embodiments of the invention may now be described. The exemplary embodiments are provided to illustrate aspects of the invention and should not be construed as limiting the scope of the invention. When the exemplary embodiments are described with reference to block diagrams or flowcharts, each block may represent a method step or an apparatus element for performing the method step. Depending upon the implementation, the corresponding apparatus element may be configured in hardware, software, firmware or combinations thereof. Here after, a pilot signal may mean a signal transmitted by one antenna for the purpose of estimating the channel between the transmitting antenna and one or more receiving antennas. It may also be called a reference signal, a channel estimation signal or a test signal.

In the following descriptions, an antenna is used to indicate a RF circuit path that includes the RF circuits and the antenna unless indicated by the context otherwise, for example, in a hybrid beamforming system, one RF path may be connected to multiple antenna elements via a beamforming circuit, mostly analog. In such a system, all the antenna elements connected to the same RF path can be treated as a single equivalent antenna in baseband processing.

OTA Channels Connecting BS Under Test and RF Channel Emulator

To overcome the lack of antenna ports for connecting cables or the hassle of connecting a large number of cables, it is desired that the connection between a massive MIMO BS and a RF channel emulator uses OTA channels. However, the OTA channels must not reduce the rank of the channel matrix for the channels connecting the BS and UEs.

Let the channel matrix between the M Tx/Rx paths/antennas on the BS and the K Tx/Rx paths/antennas of the UEs be H, where H is a K×M matrix. In DL, $y_d = Hx_d$, where $y_d$ is a K×1 vector of signals received by the UEs and $x_d$ is a M×1 signals emitting out of the antenna elements of the M Tx paths of the BS. In UL, $x_u = H^T y_u$, where $y_u$ is a K×1 vector of signals emitting out of the K antenna elements of the UEs and $x_u$ is a M×1 signals received by the M Rx paths of the BS.

Furthermore, let the channel matrix between the M Tx/Rx paths/antennas on the BS and the N Tx/Rx paths/antennas of the channel emulator be G, where N≥M and G is an N×M matrix. Let the channel matrix implemented by the circuits of the channel emulator be Q, where Q is an K×N matrix which can be built using channel models of the intended environment and application and can be updated in real-time to reflect the time variation of the channels.

Figure 1:
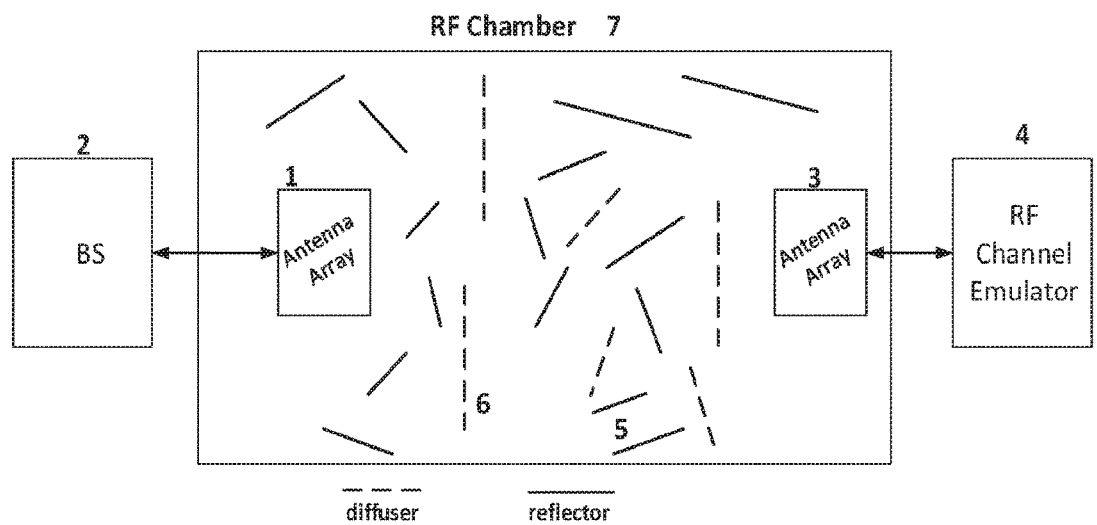
FIG. 1 shows the system for configuration for using OTA channels to connect a BS and a RF channel emulator.

Therefore, the total channel between the BS and UEs with the RF channel emulator in between becomes $y_d = QGx_d = Hx_d$, i.e., H=QG. For the RF channel emulator to serve its intended function, the rank of the G matrix should be M, or the K×K matrix QG(QG)* should be full rank, where (QG)* is the conjugate transpose of QG. In a special case, N=M and the G matrix approximates an identity matrix. In one embodiment, reflectors and/or diffusers are placed between the antenna array of the BS and the antenna array of the RF channel emulator to create a G matrix with the required rank. Furthermore, it is desired that the G matrix is time-invariant or has a sufficiently long coherence time so that channel variations are accounted for and modeled by the Q matrix, which is implemented and can be updated by the RF channel emulator. In one embodiment as shown in FIG. 1, the antenna array 1 of the BS 2, the antenna array 3 of the RF channel emulator 4 and the reflectors 5 and/or diffusers 6 placed between them for creating multipath are placed inside a RF chamber 7 that isolates the equipment and channels from the outside environment so that the G matrix is time-invariant or has a sufficiently long coherence time. Furthermore, the G matrix can be estimated and its effect can be removed before the RF channel emulator applies the channel model matrix. Without loss of generality, assume N=M and consider DL. The BS can transmit pilot signals using its antennas to the RF channel emulator, which can use the received pilot signal to estimate the M×M channel matrix G between the BS and RF channel emulator. In RF channel emulation operation, the signals received by the RF channel emulator is $z_d=Gx_d$. The RF channel emulator first computes $p_d=G^{-1}z_d=x_d$, to recover $x_d$, where $G^{-1}$ exists because the reflectors and/or diffusers make the channel matrix G full rank. The RF channel emulator then applies the channel model Q to the recovered signal and the UEs connected to the RF channel emulator will receive $y_d=Qx_d=Hx_d$, i.e., the channel model H is entirely attributed to and modeled by the Q matrix in the RF channel emulator.

Similarly on the side of the RF channel emulator that connects to UEs, OTA channels can be used to connect the RF channel emulator with the UEs. In the preferred embodiment, the UEs are also placed inside a RF chamber that isolates the equipment and channels from the outside environment so that the channel variations are accounted for and modeled by the Q matrix of the RF channel emulator. Similarly, reflectors and/or diffusers are placed between the RF channel emulator and the UEs to make the channel matrix full rank, and the effect of this channel matrix can be removed by estimating the channels and having the RF channel apply the inverse matrix. In practice, since the number of RF circuit paths for connecting to UEs is much smaller than the number of RF circuit paths on the massive MIMO BS side, cable connections can be used for connecting the RF channel emulator to the UEs.

In FIG. 1, the BS and RF channel emulator are placed outside of the RF chamber, but they can also be placed inside the RF chamber if power supply is available. Furthermore, the UEs can also be placed inside the RF chamber.

In the development process, there may be needs to connect the antenna ports on the BS directly to the RF channel emulator using cable, without using OTA channel, thus without the need of the reflectors and/or diffusers to create multipath, nor the need of antenna array on the RF channel emulator. In another embodiment, the RF channel emulator has both M cable ports for connecting to the M ports on the BS and an antenna array $A_E$ for connecting to the antenna array $A_B$ on the BS via OTA channels that have sufficient multipath. Furthermore, the antenna array $A_E$ can use the same antenna ports on the RF channel emulator, wherein in one configuration, the antenna array $A_E$ is removed to expose the antenna ports to connect the antenna ports on the BS via cables, and in another configuration, the antenna array $A_E$ is connected to the antenna ports on the RF channel emulator for connecting the antenna array $A_B$ on the BS via OTA channels.

Calibration to Preserve OTA Channel Reciprocity

Figure 2:
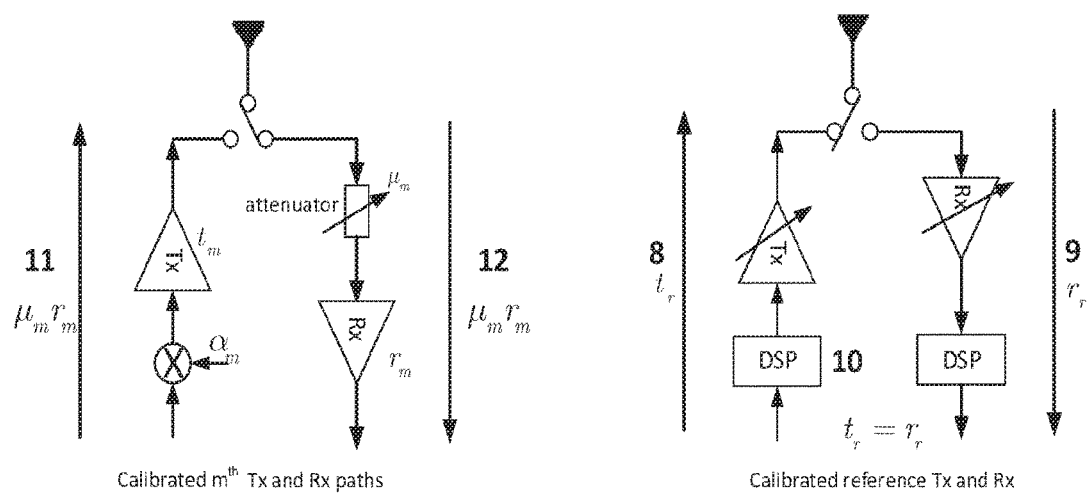
FIG. 2 shows a calibration process and circuit to preserve the reciprocity of the OTA channels when a RF channel emulator is inserted between a BS and UEs and the connection between the BS and the RF channel emulator is OTA.

In a massive MIMO system, there is an advantage in using UL sounding signal to estimate DL channels by making use of the reciprocity of the OTA channels, if both UL sounding and DL transmission use the same frequency and antennas. This is true in general for TDD systems and can be made true for FDD systems using an invention described in PCT/US14/71752. Therefore, the RF channel emulator should maintain the reciprocity of the channels between the BS and the UEs. When OTA channels are used between the BS and the RF channel emulator, one embodiment maintains channel reciprocity by estimating and calibrating the Tx circuit path and the Rx circuit path of each antenna on the RF channel emulator. In one case, a reference Tx and Rx pair and antenna are used in the calibration, wherein the reference Tx and Rx pair and antenna can be one of the antennas in the antenna array of the RF channel emulator, or a specialized antenna used specifically for the purpose of calibration. Before the RF channel emulator is used to test a MIMO BS, the reference Tx and Rx pair are calibrated to ensure the transfer function of its Tx path $t_r$ 8 and the transfer function of its Rx path $r_r$ 9 are matched, that is, $t_r=r_r$, as shown in FIG. 2, which can be achieved using a digital signal processing (DSP) module 10, and/or tunable Tx and Rx circuit paths. Then, the reference Tx sends a pilot signal s via the reference antenna for receiving by the antennas of the RF channel emulator, and the received signal by the $m^{th}$ Rx path is $y_m=\mu_m r_m h_{mr} t_r s$ where $h_{mr}$ is the OTA channel between the $m^{th}$ antenna and the reference antenna which is reciprocal, i.e., $h_{mr}=h_{rm}$ and $\mu_m$ is the attenuation of $m^{th}$ Rx path. Next, each of the Tx paths of the RF channel emulator transmits the same pilot signal s via its antenna to the reference, Rx path via the same reference antenna, and the received signal by the reference Rx path is $y_r=r_r h_{mr} t_m s$. By finding the ratio we can find $$\alpha_m = \frac{y_m}{y_r} = \frac{\mu_m r_m h_{mr} t_r s}{r_r h_{mr} t_m s} = \frac{\mu_m r_m t_r}{r_r t_m} = \frac{t_r}{r_r}\frac{\mu_m r_m}{t_m} = \frac{\mu_m r_m}{t_m}$$

where the last step is obtained because the reference Tx and Rx pair are matched, i.e., $$\frac{t_r}{r_r} = 1.$$

Then, during normal operation of the RF channel emulator, the signal to be transmitted by the $m^{th}$ Tx path is first multiplied by $\alpha_m$. As a result, the effective transfer function of the $m^{th}$ Tx path 11 of the RF channel emulator becomes $\mu_m r_m$ which is the same as the transfer function of $m^{th}$ Rx path 12 of the RF channel emulator, as shown in FIG. 2. Thus, reciprocity of the channel is preserved. Note that the Tx and Rx paths connecting to the UEs via cables do not need to be calibrated as their asymmetry or discrepancy can be lumped with that of the UEs, which are specific to each UE and do not affect the beamforming.

Figure 3:
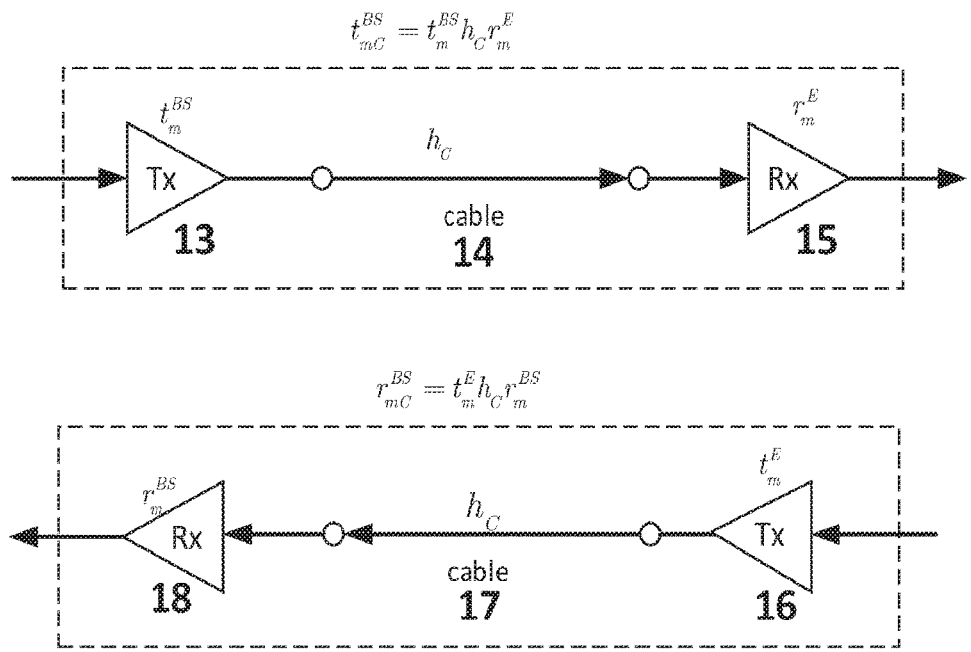
FIG. 3 shows a calibration process and circuit to preserve the reciprocity of the OTA channels when a RF channel emulator is inserted between a BS and UEs and the connection between the BS and the RF channel emulator uses cables.

When cables are used to connect the antenna parts of the BS and the RF channel emulator, one embodiment enables channel reciprocity for DL channel estimation by performing a relative calibration that accounts for the RF channel emulator RF circuit paths. A relative calibration method such as the one described in U.S. Provisional Patent Application 62/190,981 filed on Jul. 10, 2015 can be used. The steps for accounting for the RF channel emulator RF circuit paths include having the BS performs a relative calibration of its Tx and Rx paths as shown in FIG. 3 and use the combined $m^{th}$ BS Tx path $t_{mC}^{BS}$ of BS Tx circuit path+cable+RF channel emulator Rx path as the effective Tx path of the BS, i.e., $t_{mC}^{BS}=t_m^{BS} h_C r_m^E$, where $t_m^{BS}$ 13 is the transfer function of the $m^{th}$ Tx path of the BS 13, $h_C$ is the channel via the cable between the $m^{th}$ Tx path of the BS and $m^{th}$ Rx path of the RF channel emulator 14, and $r_m^E$ is the transfer function of the $m^{th}$ Rx path of the RF channel emulator 15, and similarly use the combined $m^{th}$ BS Rx path $r_{mC}^{BS}$ of RF channel emulator Tx circuit path+cable+BS Rx path as the effective Rx path of the BS, where $r_{mC}^{BS}=t_m^E h_C r_m^{BS}$ is the transfer function of the $m^{th}$ Tx path of the RF channel emulator 16, $h_C$ is the reciprocal cable channel between the $m^{th}$ Tx path of the RF channel emulator and $m^{th}$ Rx path of the BS 17, and $r_m^{BS}$ is the transfer function of the $m^{th}$ Rx path of the BS 18.

When DL signaling and UL feedback is used for DL channel estimation, such as typical in an FDD system, the above calibration of the Tx circuit path and the Rx circuit path of each antenna on the RF channel emulator can be skipped.

Emulating Carrier Aggregation

Figure 4:
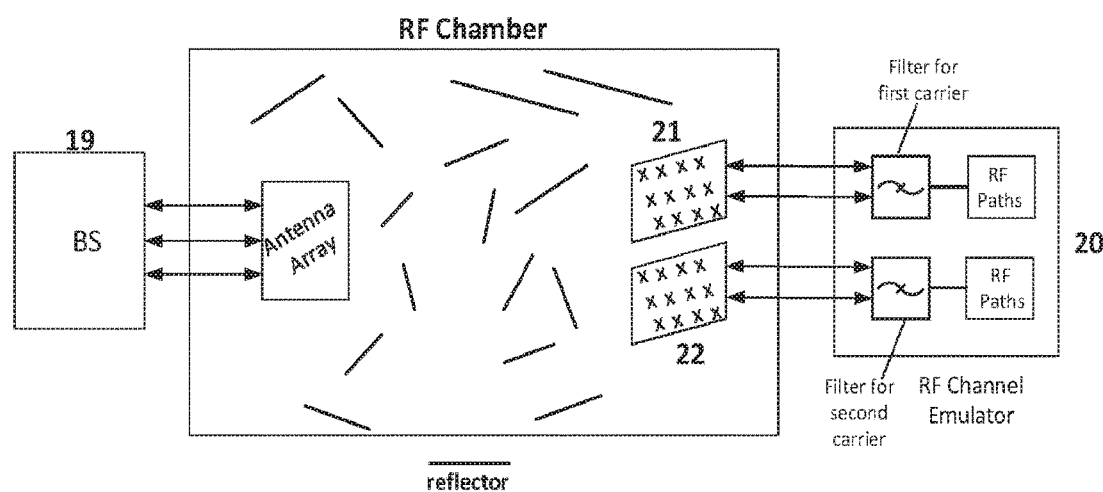
FIG. 4 shows a configuration of a RF channel emulator that supports carrier aggregation testing when the connection between the BS and the RF channel emulator is OTA.

Carrier aggregation is becoming widely used to increase the data rates in mobile networks. Therefore, it is desired that a RF channel emulator can be used for testing BS and UEs that use carrier aggregation. In one embodiment, when OTA channels are used between the BS 19 and the RF channel emulator 20 as described above, a first subset of the antennas 21 and RF circuit paths of the RF channel emulator are used to communicate with the BS in a first carrier and a second subset of the antennas 22 and RF circuit paths of the RF channel emulator are used to communicate with the BS in a second carrier, as shown in FIG. 4. This embodiment can be easily extended to aggregating more than two carriers.

Figure 5:
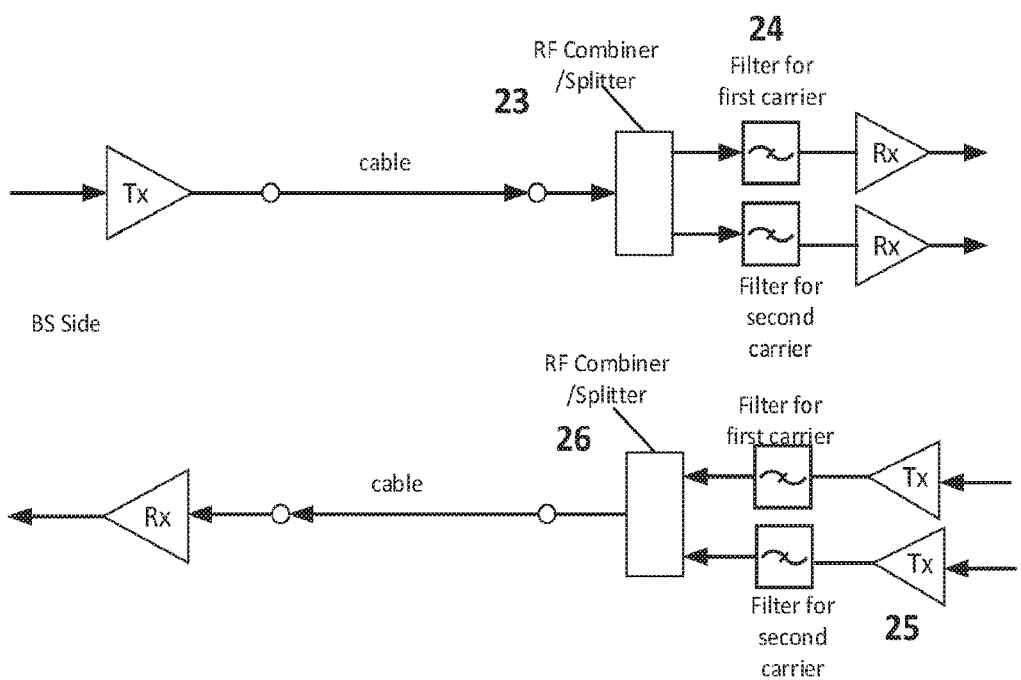
FIG. 5 shows a configuration of a RF channel emulator that supports carrier aggregation testing when the connection between the BS and the RF channel emulator uses cables.

In another embodiment, when cables are used to connect the BS and the RF channel emulator, each RF port on the RF channel emulator is connected to a RF combiner/splitter as shown in FIG. 5 for aggregating two carriers. The port on the single port side of the RF combiner/splitter is connected to a corresponding RF port on the BS, and each port on the multiport side of the RF combiner/splitter is connected to a pair of Tx and Rx circuit paths of the RF channel emulator in the TDD case via a RF switch, or to a duplexer or filter that separates the DL and UL channels in a FDD system. In the DL, the RF combiner/splitter 23 splits the signal into two or more Rx RF circuit paths, each of which uses a filter 24 select the carrier it is designated to process. The RF channel emulator applies the channel to signals on each of the carrier and transmits them to the UEs. In the UL, the RF combiner/splitter 26 combines the signal from two or more Tx RF circuit paths 25 to produce the aggregated signals to transmit to the BS, each of which uses a filter select the carrier it is designated to process. This embodiment can be easily extended to aggregating more than two carriers.

On the side of the RF channel emulator that connects to UEs, if the connection is via OTA channel, similar to the connection to the BS side, a first subset of the antennas and RF circuit paths of the RF channel emulator are used to communicate with the UEs in a first carrier and a second subset of the antennas and RF circuit paths of the RF channel emulator are used to communicate with the UEs in a second carrier. On the other hand, if the connection between the RF channel emulator and UEs are cables, the RF combiner/splitter circuit described above for the BS side can be used.

Configuring and Controlling the RF Channel Emulator

In one embodiment, the RF channel emulator is connected to a computer, wherein the said computer can be either integrated within the same enclosure of the RF channel emulator or external to the RF channel emulator. A user interface is provided on the computer to enable a user to configure the RF channel emulator, download channel models into the RF channel emulator, perform calibration of the RF channel emulator and/or obtain or monitor the status and other data from the RF channel emulator. The computer communicates with the RF channel emulator using a predefined protocol including command, status and data formats. The computer can either download all channel models into the RF channel emulator before the emulation of the RF channels, with or without time parameters and transitions between different channel models over time, or dynamically download the channel models into the RF channel emulator during the emulation of the RF channels to support time-varying channel models.

Figure 6:
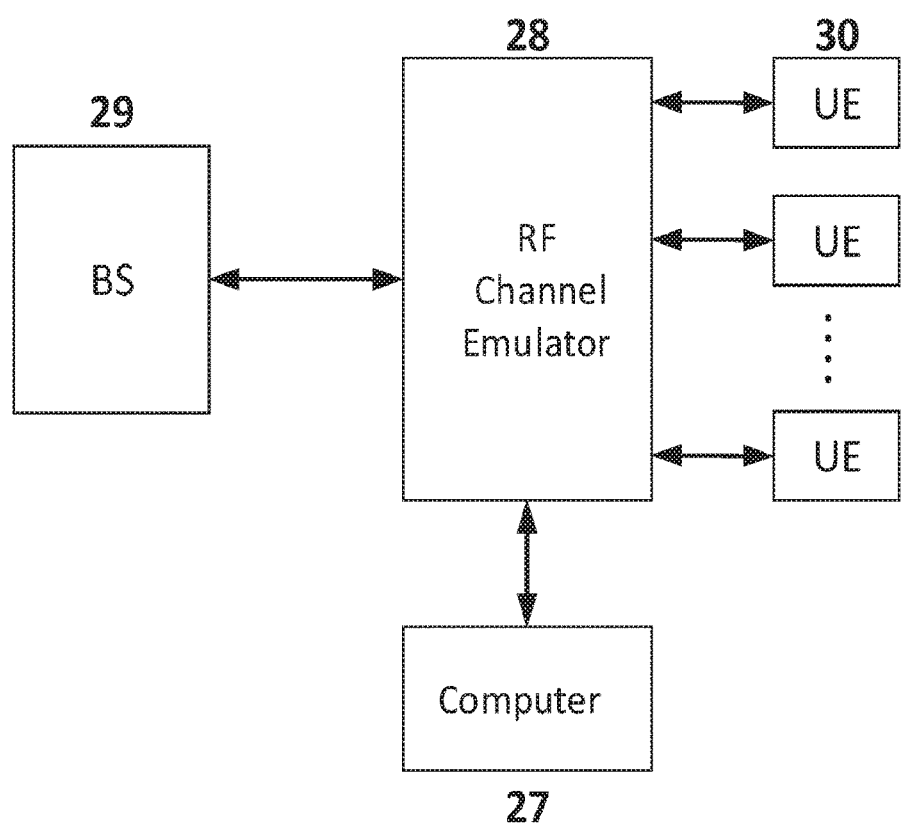
FIG. 6 shows the system configuration and application scenario of the RF channel emulator.

Embodiments of this invention are based on the system shown in FIG. 6 wherein the RF channel emulator system includes one or more computers or controller 28 connected to the RF channel emulator 29, and the wired or wireless connections with one or more MU-MIMO BS 30 and multiple UEs 31, wherein the computer or controller provides the user interface to configure the RF channel emulator, download channel models into the RF channel emulator, perform calibration of the RF channel emulator and/or obtain or monitor the status and other data from the RF channel emulator.

In another embodiment, the RF channel emulator includes both digital radio interface, e.g., CPRI, Open Radio Interface, and RF interface for connecting to a BS, and can be configured to use either interface to connect to the BS and/or UEs. In one configuration of the RF channel emulator, the digital interface is used to connect to the BS and the RF interface is used to connect to UEs. In another configuration, a subset of digital interface is used to connect to the BS and another subset of digital interface is used to connect to UEs. In yet another configuration, a subset of RF interface is used to connect to the BS and another subset of RF interface is used to connect to UEs.

In yet another embodiment, the RF channel emulator is equipped with a wired network port, e.g., Ethernet, or a wireless network module, e.g., Wifi, for it to be connected to a local area network or a wide area network, e.g., the Internet. This allows the RF channel emulator to be accessed, configured and/or monitored remotely. Furthermore, the RF channel emulator can collect the channel emulation test data from the BS and/or the UEs using the wired or wireless connections with them and provide the test data to a remote user via the network connection provided by the wired network port or wireless network module.

Although the foregoing descriptions of the preferred embodiments of the present inventions have shown, described, or illustrated the fundamental novel features or principles of the inventions, it is understood that various omissions, substitutions, and changes in the form of the detail of the methods, elements or apparatuses as illustrated, as well as the uses thereof, may be made by those skilled in the art without departing from the spirit of the present inventions. Hence, the scope of the present inventions should not be limited to the foregoing descriptions. Rather, the principles of the inventions may be applied to a wide range of methods, systems, and apparatuses, to achieve the advantages described herein and to achieve other advantages or to satisfy other objectives as well.

We claim:

1. A method for testing a Multiple-User Multiple-Input Multiple-Output (MU-MIMO) wireless communication system comprising:
   connecting the signals from and to K testing User Equipment (UEs) each of which has one or more transmitting and receiving paths and the associated antennas with a MU-MIMO Channel Emulator (M-CE) using wired or over-the-air (OTA) wireless connections, wherein K>1,
   connecting the signals from and to a Base Station (BS) with M transmitting and receiving paths and the associated antennas with a M-CE using wired or wireless connections, wherein the BS is capable of spatial multiplexing N beams on the same frequency and time resource to communicate with the K UEs wherein M≥N≥K and the BS communicates with a UE using one or more spatial beams;
   in the M-CE in the downlink, obtaining the baseband digital signals from the signals received from the M transmitting paths or the associated antennas of the BS, applying to the baseband digital signals filters designed based on one or more models of the channels from the BS to the K UEs in the intended environment or application to map the set of signals transmitted by the M transmitting paths or the associated antennas of the BS to the set of signals to be received by the receiving paths or the associated antennas of the K UEs, and converting and transmitting the filtered digital baseband signals to the receiving paths or associated antennas of the K UEs, and,
   in the M-CE in the uplink, applying to the baseband signals filters designed based on one or more models of the channels from the K UEs to the BS in the intended environment or application to map the set of signals transmitted by the transmitting paths or the associated antennas of the K UEs to the set of signals to be received by the M receiving paths or the associated antennas of the BS, and converting and transmitting the filtered digital baseband signals to the receiving paths or associated antennas of the BS.

2. The method in claim 1 further comprising calibrating transmitting and receiving paths of the M-CE connecting with the BS to achieve reciprocity of the downlink and the uplink channels.

3. The method in claim 1 further comprising in the channel emulation operation, applying a calibration operated to one or both of each pair of transmitting path and receiving path of the M-CE so that the effective transfer functions of each pair of transmitting path and receiving path of the M-CE are the same.

4. The method in claim 1 wherein the wired or OTA wireless connections between the BS and the M-CE produce a channel matrix with a rank not less than M, and the wired or wireless connections between the M-CE and the K UEs produce a channel matrix with a rank not less than N.

5. The method in claim 1 further comprising
   configuring the wired or OTA wireless connections between the BS and the M-CE to produce a channel matrix with a rank not less than M;
   transmitting pilot signals from the BS to the M-CE;
   estimating the channel matrix between the BS and the M-CE; and
   applying the inverse or pseudoinverse of the channel matrix to the baseband digital signals to remove the effect of the channels of the connections between the BS and the M-CE.

6. The method in claim 5 further comprising equipping the M-CE with M or more transmitting and receiving paths and associated antennas to ensure the rank of the channel matrix of the OTA wireless connection between the BS and the M-CE is M.

7. The method in claim 5 further comprising using a RF chamber to isolate the channel matrix of the OTA wireless connection between the BS and the M-CE from outside interference.

8. The method in claim 7 further comprising using reflectors, diffusers and/or other devices inside the RF chamber to produce a full rank channel matrix of the OTA wireless connection between the BS and the M-CE.

9. The method in claim 1 further comprising providing a user interface to accept user inputs to select or enter parameters of channel models and/or antenna models.

10. The method in claim 1 further comprising downloading all channel models into a memory of the M-CE before the emulation of the RF channels and specifying time parameters and transitions between different channel models over time to emulate the time variation of the channels.

11. The method in claim 1 further comprising updating the channel model in the M-CE in real-time to emulate time-varying channels.

12. The method in claim 1 further comprising:
    dynamically downloading new channel models into the M-CE; and,
    applying the newly downloaded channel model in real-time to emulate time-varying channels.

13. The method in claim 1 further comprising providing both a wired digital radio interface and a wired analog RF interface on the M-CE which can be configured to use either interface to connect to the BS.

14. The method in claim 1 further comprising providing both a wired analog RF interface and an antenna array interface on the M-CE which can be configured to use either the wired interface or the OTA wireless interface to connect to the BS.

15. The method in claim 14 further comprising using the same antenna ports for both the wired analog RF interface and the antenna array interface.

16. The method in claim 1 further comprising using multiple antenna arrays to connect to the M-CE in an OTA wireless connection between the BS and the M-CE to emulate carrier aggregation, wherein each antenna array and the associated transmitting and receiving paths are used to communicate with the BS in a specified carrier frequency.

17. The method in claim 1 further comprising using combiners/splitters for aggregating more than one carrier frequencies in channel emulation, wherein the port on the single-port side of a combiner/splitter is connected to a corresponding RF port on the BS, and each port on multiport side of the combiner/splitter is connected to a RF port on the M-CE.

18. The method in claim 1 further comprising using RF switches that are synchronized to the BS downlink and uplink switching at the M-CE's RF ports to switch the RF port's connection between a transmitting path and receiving path associated with a RF port to emulate a time division duplex (TDD) system.

19. The method in claim 1 further comprising using duplexers or filters that separate the downlink and uplink channels at the M-CE's RF ports into the receiving path and the transmitting path associated with a RF port to emulate a frequency division duplex (FDD) system.

20. The method in claim 1 further comprising providing network connection in the M-CE for it to be connected to a local area network or a wide area network to enable the M-CE to be accessed, configured and/or monitored remotely.

21. An apparatus for emulating a Multiple-User Multiple-Input Multiple-Output (MU-MIMO) wireless communication system comprising,
wired or over-the-air (OTA) wireless interface for connecting the apparatus with K testing User Equipment (UEs) wherein K>1 and each UE has one or more transmitting and receiving paths and the associated antennas;
wired or over-the-air (OTA) wireless interface for connecting the apparatus with a Base Station (BS) which has M transmitting and receiving paths and the associated antennas, is capable of spatial multiplexing N beams on the same frequency and time resource to communicate with the K UEs wherein M≥N≥K and the BS communicates with a UE using one or more spatial beams;
one or more memories for storing instructions and channel models,
one or more processors which transforms signals transmitted by a BS (and/or by K UEs) to signals received by K LPs (and/or by a BS) to emulate the communication channels between the BS and the K UEs;
a module that obtains the baseband digital signals from the signals received from the M transmitting paths or the associated antennas of the BS, and sends the baseband signals to the one or more processors which apply to the baseband digital signals filters designed based on one or more models of the channels from the BS to the K UEs in the intended environment or application to map the set of signals transmitted by the M transmitting paths or the associated antennas of the BS to the set of signals to be received by the receiving paths or the associated antennas of the K UEs;
a module that converts and transmits the filtered digital baseband signals to the receiving paths or associated antennas of the K UEs;
a module that obtains the baseband digital signals from the signals received from the transmitting paths or the associated antennas of the K UEs, and sends the baseband signals to the one or more processors which apply to the baseband digital signals filters designed based on one or more models of the channels from the K UEs to the BS in the intended environment or application to map the set of signals transmitted by the transmitting paths or the associated antennas of the K UEs to the set of signals to be received by the M receiving paths or the associated antennas of the BS; and
a module that converts and transmits the filtered digital baseband signals to the M receiving paths or associated antennas of the BS.

22. The apparatus in claim 21 further comprising a module that calibrates transmitting and receiving paths of the apparatus that connect with the BS to achieve reciprocity of the downlink and the uplink channels.

23. The apparatus in claim 21 wherein the baseband signals received from or transmitted to the BS on one or both of each pair of transmitting path and receiving path of the apparatus are operated on so that the effective transfer functions of each pair of transmitting path and receiving path of the apparatus are the same.

24. The apparatus in claim 21 wherein the wired or over-the-air (OTA) wireless interface for connecting the apparatus with a Base Station (BS) produces a channel matrix of rank not less than M, and the wired or OTA wireless interface for connection the apparatus with the K UEs produce a channel matrix of rank not less than N.

25. The apparatus in claim 21 further comprising a module that:
receives one or more pilot signals transmitted from the BS, estimates the channel matrix between the BS and apparatus; and
applies the inverse or pseudoinverse of the channel matrix to the baseband digital signals to remove the effect of the channels of the connections between the BS and apparatus, wherein the wired or over-the-air (OTA) wireless interface for connecting the apparatus with a Base Station (BS) produces a channel matrix of rank not less than M.

26. The apparatus in claim 25 further comprising M or more transmitting and receiving paths and associated antennas on the apparatus to ensure the rank of the channel matrix of the OTA wireless connections between the BS and the apparatus is M.

27. The apparatus in claim 21 further comprising a user interface to accept user inputs to select or enter parameters of channel models and/or antenna models.

28. The apparatus in claim 21 wherein the one or more processors store the download of all channel models into the one or more memories before the emulation of the RF channels and transition between different channel models over time based on timing information stored in the one or more memories to emulate the time variation of the channels.

29. The apparatus in claim 21 wherein the one or more processors update the channel model in in real-time to emulate time-varying channels.

30. The apparatus in claim 21 wherein the one or more processors dynamically receive download of new channel models in real-time and apply the newly downloaded channel model to emulate time-varying channels.

31. The apparatus in claim 21 further comprising both a wired digital radio interface and a wired analog RF interface which can be configured to use either interface to connect to the BS.

32. The apparatus in claim 21 further comprising both a wired analog RF interface and an antenna array interface on the apparatus which can be configured to use either the wired interface or the OTA wireless interface to connect to the BS.

33. The apparatus in claim 32 wherein the same antenna ports are used for both the wired analog RF interface and the antenna array interface.

34. The apparatus in claim 21 further comprising multiple antenna arrays to wirelessly connect to the BS to emulate carrier aggregation, wherein each antenna array and the associated transmitting and receiving paths are used to communicate with the BS in a specified carrier frequency.

35. The apparatus in claim 21 further comprising combiners/splitters for aggregating more than one carrier frequencies in channel emulation, wherein the port on the single-port side of a combiner/splitter is connected to a corresponding RF port on the BS, and each port on multiport side of the combiner/splitter is connected to the RF port on the apparatus.

36. The apparatus in claim 21 further comprising RF switches that are synchronized to the BS downlink and uplink switching at RF ports of the apparatus to switch the RF port's connection between a transmitting path and receiving path associated with a RF port to emulate a time division duplex (TDD) system.

37. The apparatus in claim 21 further comprising using duplexers or filters that separate the downlink and uplink channels at RF ports of the apparatus into the receiving path and the transmitting path associated with a RF port to emulate a frequency division duplex (FDD) system.

38. The apparatus in claim 21 further comprising a network connection module for connecting to a local area network or a wide area network to enable the apparatus to be accessed, configured and/or monitored remotely.

* * * * *